May 10, 1927.
J. S. KIRFMAN
1,628,249
STRUCTURE FOR TRELLISES AND THE LIKE
Filed Oct. 13, 1924
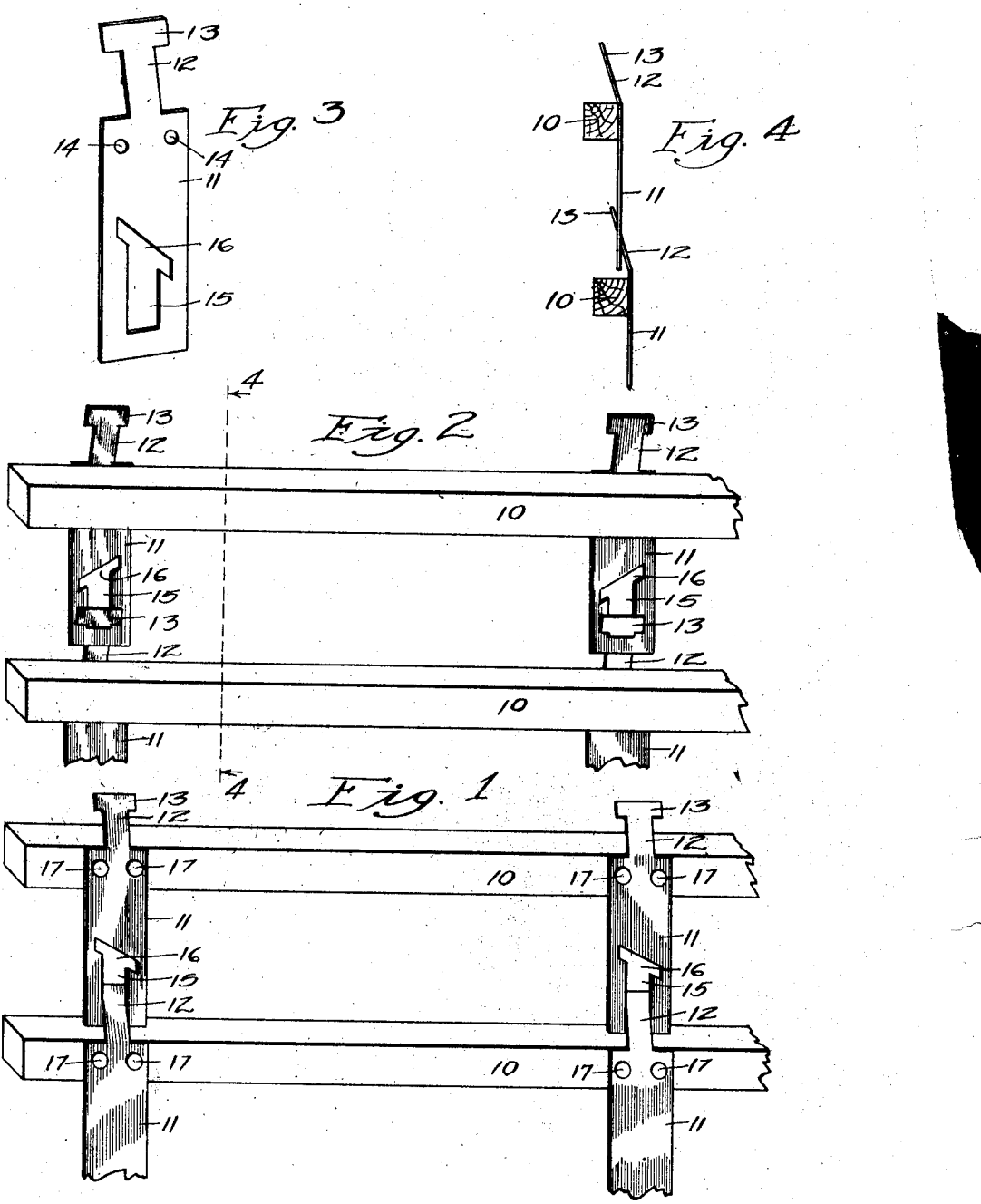

Patented May 10, 1927.

1,628,249

UNITED STATES PATENT OFFICE.

JOHN S. KIRFMAN, OF DES MOINES, IOWA.

STRUCTURE FOR TRELLISES AND THE LIKE.

Application filed October 13, 1924. Serial No. 743,396.

The purpose of my invention is to provide a structure of simple, effective and inexpensive construction, for trellises, tree-guards, flower bed guards and so on.

More particularly, it is my object to provide such a device, having a plurality of bars, flexibly connected together for adjustment toward or from each other.

Another object is to provide in such a device, a series of such bars and to provide a novel device for detachably connecting the bars together to permit the entire device to be expanded or contracted in length with a minimum of effort and without removing or inserting parts, and also to permit the device to be rolled into a bundle or formed into a circle or other desired shape.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a front view of a portion of a trellis embodying my invention.

Figure 2 is a rear view of the same.

Figure 3 shows a plan view of one of the metal connecting members; and

Figure 4 shows a detailed, sectional view taken on the line 4—4 of Figure 2.

I have devised a structure, which is adapted to be used for making trellises or making a protector for the trunks of trees or for flower beds or the like.

This structure is composed of a series of parallel bars suitably connected together.

Insomuch as the devices may be hung with the bars horizontal for trellises, or may be arranged with the bars vertical for devices to be put around garbage cans, flower beds or trees, it is desirable to have them arranged with considerable flexibility.

In order that they may automatically adjust themselves to the growth of trees and that they may be adjustable readily to the sizes of different flower beds, it is also desirable that the bars should be adjustable toward and from each other.

For this purpose, I have provided novel means for connecting the bars together to permit such adjustment.

In the drawings herewith, I have used the reference numeral 10 to indicate generally the bars used in making my structure. These bars are connected together with metal plates or connecting devices.

One of the connecting devices is shown in the plan view in Figure 3. It consists preferably of a plate 11 substantially rectangular in outline, having at one end a tongue 12, projecting from the end and terminating in the cross bar 13 wider from side to side than the tongue 12. The tongue 12 and the cross bar 13 form a T-shaped member.

The plate 11 is provided near the end having the T-shaped member with holes 14 to receive nails or screws, whereby the plate is fastened to the bar 10.

In the plate 11, there is provided an elongated slot 15 of such width as to receive the tongue 12. At the end of the slot 15 adjacent to the tongue 12, the slot is widened to form an inclined slot portion 16 wider from side to side, than the slot portion 15 and inclined from the longitudinal axis of the plate 11, as shown.

I preferably fasten two of the plates 11 to each bar 10 by means of nails or the like 17, as shown particularly in Figure 1.

The head or cross bar 13 on the plate 11 secured to the bar 10 is inserted through the inclined slot member 16, and then the tongue 12 is slid into the slot member 15.

In actual construction, various methods may be used. For instance, the bars 10 may be laid in proper spaced relations. The plates 11 may then be nailed to the first bar 10. There may be two or more of the plates 11 secured to each bar 10 depending upon the length of those bars. Assuming that there are two plates for each bar, the plates for the next successive bar 10, after the first one, are then connected with the plates on the first bar, by slipping the members 13 through the openings 16 and sliding the tongues 12 into the slots 15, and thereon the second pair of plates 11 are nailed to the second bar 10.

This process is carried on until all of the bars 10 are connected together.

I have found in the actual use of my trellises that when they are put away for the winter, they are frequently rolled. When they are thus rolled, it is desirable that they should not accidentally fall apart. In order to prevent their accidental separation, I have arranged the slot member 16, inclined as shown.

It thus follows that even though the members 12 should slide to position registering with the slot members 16, the members 13 will not slide out of the slot members 16.

When it is desirable to add more bars to an already completed trellis, a section of trellis may be added by placing the section in such a position that the head one of the plates on the end bar of the section is aligned with the slot in the corresponding plate on the completed trellis, when the plates on one side may be linked together.

The other ends of the end bars are then brought together, and the head of one plate may be twisted with a pair of pliers until it is in the proper position to enter the slot in the corresponding plate on the completed trellis.

After inserting the head in the slot, it is twisted back to its former position in order to lock it in place.

It will be noted, by referring to Figure 2, that it is impossible for the head 13 to be removed from the slot 16 without twisting.

In order to separate the bars, it is necessary to take a pair of pliers or some other tool and slightly twist or bend the members 12 until the members 13 can be removed through the slot members 16.

It will, of course, be understood that the plates 11 are made of such material, as to permit such bending and to also permit the trellises to be rolled up or arranged in a circle around the flower bed, with the members 10 standing on end.

A device of this kind has great flexibility and thus also has expansibility and contractability.

It thus follows that the device when completed can be adapted to a great variety of uses and can be expanded or contracted or rolled up without any danger of coming apart.

For instance, when a trellis is up, and is covered with vines, the only way to roll a trellis with the vines on it is to roll from the top down, until the roll is on the ground, where it can be covered for the winter.

Some changes may be made in the details of the structure without departing from the real spirit and purpose of my invention, and it is my invention to cover by my claim, any modified forms of structure or use of mechanical equivalents, which may be reasonably included within its scope.

I have found that the device works with reasonable satisfaction with other constructions, but by making the peculiar arrangements of the slots herein disclosed, I can avoid some difficulties that have heretofore occurred in connecting the bars 10 together.

I claim as my invention:

A structure having a series of parallel bars, means for connecting these bars comprising a plurality of connecting members, each comprising a plate substantially rectangular in outline having at one end a T-shaped head and at the other a substantially T-shaped slot with the laterally extending portions of said slot inclined from the longitudinal axis of the plate, whereby the completed structure has expansibility and contractability with possible movement of the bars toward or from each other, so that the bars may be arranged in a circle or other forms, without removal of said T-shaped head from said slot.

Des Moines, Iowa, July 24, 1922.

JOHN S. KIRFMAN.